United States Patent [19]

Hattori et al.

[11] 4,164,914
[45] Aug. 21, 1979

[54] AIR-FUEL RATIO CONTROLLING APPARATUS FOR AN INTERNAL COMBUSTION ENGINE

[75] Inventors: Tadashi Hattori, Okazaki; Akira Takata; Tamotsu Fukuda, both of Toyota; Takamichi Nakase, Gamagori, all of Japan

[73] Assignees: Nippon Soken, Inc., Nishio; Toyota Jidosha Kogyo Kabushiki Kaisha, Toyota, both of Japan

[21] Appl. No.: 783,429

[22] Filed: Mar. 31, 1977

[30] Foreign Application Priority Data

May 13, 1976 [JP] Japan .................. 51-61051[U]
May 13, 1976 [JP] Japan .................. 51-61052[U]

[51] Int. Cl.² ...................... F02M 7/00; F02M 23/04
[52] U.S. Cl. .................... 123/32 EE; 123/119 DB; 123/124 A; 123/124 B
[58] Field of Search ........... 123/124 R, 124 A, 124 B, 123/119 D, 119 DB, 119 EC, 32 EE

[56] References Cited

U.S. PATENT DOCUMENTS

| B 405,899 | 3/1976 | Moriya et al. | 123/119 A |
| 3,677,241 | 7/1972 | Gele et al. | 123/124 B |
| 3,759,232 | 9/1973 | Wahl et al. | 123/119 DB |
| 3,911,884 | 10/1975 | Moriya et al. | 123/119 EC |
| 3,977,375 | 8/1976 | Laprade et al. | 123/119 D |
| 4,015,568 | 4/1977 | Horiye et al. | 123/124 R |
| 4,036,186 | 7/1977 | Hattori et al. | 123/124 R |

Primary Examiner—Carlton R. Croyle
Assistant Examiner—Thomas I. Ross
Attorney, Agent, or Firm—Cushman, Darby & Cushman

[57] ABSTRACT

An apparatus for controlling the air-fuel ratio of an air-fuel mixture to be supplied into a combustion chamber of an internal combustion engine comprises a passage bypassing a carburetor and a throttle valve of the engine for supplying an additional air into the engine intake duct downstream of the throttle valve to dilute the air-fuel mixture to an air-fuel ratio most suited for the engine operation. An air valve is provided in the bypass passage to vary the air-flow cross-sectional area of the passage. The opening of the air valve is controlled mainly in accordance with the air-fuel ratio of the mixture as detected by an air-fuel ratio detector in the path of flow of engine exhaust gases. A variable orifice is provided in the bypass passage downstream of the air valve and defined by a valve seat and a needle valve operatively associated therewith to vary the opening area of the orifice. The needle valve is actuated by a pneumatic valve actuator which is responsive to variations in the engine manifold vacuum. The arrangement is such that the pressure difference across the air valve is kept substantially constant whereby the supply of the additional air is substantially in proportion to the engine intake air and free from influence by the engine manifold vacuum.

3 Claims, 5 Drawing Figures

AIR-FUEL RATIO CONTROLLING APPARATUS FOR AN INTERNAL COMBUSTION ENGINE

The present invention relates to an apparatus for controlling the air-fuel ratio of an air-fuel mixture to be supplied into an internal combustion engine.

Many structural improvements have recently been made to internal combustion engines to overcome governmental emission control regulations for engines. One of the improvements comprises a catalytic exhaust gas reactor mounted on the exhaust pipe of an engine to catalytically purify the engine exhaust gases. In order to obtain the maximum results from the structural improvements or in order to place the exhaust gas reactor in its most optimum operating condition, it is necessary to properly control the air-fuel ratio of an air-fuel mixture to be supplied into engines. One commonly-known technique to satisfy this requirement was to detect the oxygen content of exhaust gases from an engine to put a corresponding signal into an electronic control unit. On the basis of the input signal, the control unit was operative to judge the air-fuel ratio of an air-fuel mixture fed into the engine to actuate an air valve provided in a compensating or additional air passage so that the air-flow cross-sectional area of the passage was varied to vary the supply of the additional air therethrough to the air-fuel mixture whereby the mixture is fed into the combustion chambers at a properly controlled air-fuel ratio.

The prior art air-fuel ratio controlling apparatus was arranged to feed the additional air into an engine intake pipe or duct downstream of a throttle valve therein through the additional air passage which bypassed a carburetor and the throttle valve. With this arrangement, the supply of the additional air was influenced by the engine manifold vacuum. Namely, because the manifold vacuum is increased at a light-load engine operating condition and decreased at a heavy-load engine operating condition, the air-fuel ratio could not be properly controlled unless the air valve in the bypass passage was only slightly open at the light-load operating condition and widely open at the heavy-load operating condition, respectively. In the prior art arrangement, the air valve in the bypass passage was kept slightly open at a transition operation, such as an engine operation at a transition point from light-load to heavy-load operating condition, with a disadvantageous result that the air-fuel ratio of the mixture was decreased beyond a predetermined proper air-fuel ratio and thus a rich mixture was continuously fed into the engine all the time throughout the transition operation. On the other hand, when the engine operation was changed from the heavy-load to the light-load operating condition, the air valve in the bypass passage was kept wide-open with a resultant disadvantage that the air-fuel ratio was kept larger than the predetermined ratio with a resultant supply of a lean mixture into the engine. The air-fuel ratio of the mixture was widely varied beyond the predetermined ratio. The range of the variation greatly exceeded over a predetermined range which was most suited for the optimum exhaust gas purification performance of the catalytic reactor. Moreover, in the case where an internal combustion engine equipped with the prior art air-fuel ratio controlling apparatus was installed on an automobile, the engine suffered from surge with resultant decrease in the drivability of the automobile.

It is an object of the present invention to provide an improved and useful air-fuel ratio controlling apparatus for an internal combustion engine which is free from the difficulties and disadvantages discussed above.

It is another object of the present invention to provide an improved air-fuel ratio controlling apparatus for an internal combustion engine which is of the type that comprises a passage bypassing a carburetor and a throttle valve of the engine and an air valve provided in the bypass passage and in which the pressure difference across the air valve is kept substantially constant whereby the supply of an additional air to an air-fuel mixture produced by the carburetor is free from any influence from the engine manifold vacuum and thus is kept substantially proportional to the engine intake air throughout all the operating conditions of the engine.

The air-fuel ratio controlling apparatus according to the present invention is intended for use with an internal combustion engine of the type that includes a combustion chamber, an intake duct for supplying an air-fuel mixture into the combustion chamber, an exhaust pipe for conveying combustion gases from the combustion chamber to the atmosphere, a carburetor in the intake duct for producing the air-fuel mixture, and a throttle valve pivotally mounted in the intake duct downstream of the carburetor for controlling the flow of the air-fuel mixture through the intake duct into the combustion chamber. The apparatus includes an air-fuel ratio detecting means disposed in the exhaust pipe to detect the oxygen content of the combustion gases flowing therethrough for thereby detecting the air-fuel ratio of the air-fuel mixture supplied into the combustion chamber; a passage bypassing the carburetor and the throttle valve and having a downstream end connected to the intake duct downstream of the throttle valve for supplying an additional air into the intake duct; air valve means in the bypass passage for controlling the cross-sectional area of the bypass passage through which the additional air is permitted to flow to the intake duct downstream of the throttle valve; means drivingly connected to the air valve means and operatively associated with the air-fuel ratio detecting means for actuating the air valve means such that the air-flow cross-sectional area of the bypass passage is increased when the detected air-fuel ratio is smaller than a predetermined value; and pressure control means for controlling the pressure in the bypass passage downstream of the air valve means such that the pressure is kept substantially at a desired pressure, whereby the supply of the additional air through the bypass passage into the intake duct is precisely controlled in response to variations in the air-flow cross-sectional area of the bypass passage irrespective of variations in the pressure in the intake duct downstream of the throttle valve.

The air valve means may be in the form of a valve member, such as a butterfly valve, rotatably mounted in the bypass passage. The means for actuating the air valve means may preferably be a pulse motor which is electronically actuated by a control circuit which in turn is responsive to a signal from the air-fuel ratio detecting means. The air valve means may alternatively be in the form of a variable orifice defined by a valve seat provided in the bypass passage upstream of the pressure control means and a needle valve operatively associated with the valve seat. The needle valve may preferably be actuated by a pneumatic valve actuator which is responsive to variations in the air-fuel ratio and also in the engine intake air.

The pressure control means may preferably comprise a variable orifice defined by a valve seat provided in the bypass passage downstream of the air valve means and a needle valve operatively associated with the valve seat. The needle valve may be movable to vary the area of the variable orifice. The needle valve may be actuated preferably by a pneumatic valve actuator. In an embodiment of the invention, the valve actuator is responsive to variations in the engine manifold vacuum to drive the needle valve such that the pressure difference in the bypass passage across the air valve means is kept substantially constant whereby the supply of the additional air through the bypass passage into the intake duct downstream of the throttle valve is free from any influence from the engine manifold vacuum.

The above and other objects, features and advantages of the present invention will be made more apparent by the following description with reference to the accompanying drawings.

Figure 1:
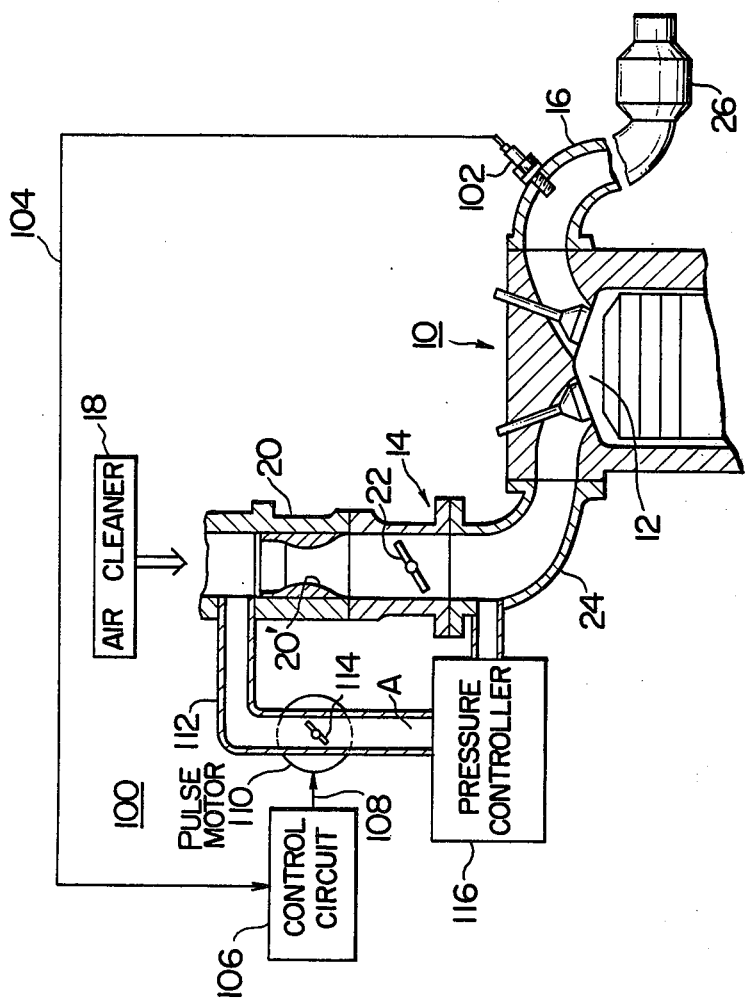
FIG. 1 is a partly diagrammatic and partly sectional view of an internal combustion engine equipped with an embodiment of an air-fuel ratio controlling apparatus according to the present invention.

FIG. 1 illustrates a conventional 4-stroke, reciprocal piston internal combustion engine 10 including a combustion chamber 12, an intake duct 14 and an exhaust pipe 16. The intake duct 14 includes an air cleaner 18, a carburetor 20 downstream of the air cleaner 18, a throttle valve 22 downstream of the carburetor 20 and an intake manifold 24 downstream of the throttle valve 22. The throttle valve 22 is operable by an operator in known manner. The carburetor 20 is of a conventional structure and includes a venturi 20' into which air from the air cleaner 18 and a fuel from a fuel circuit (not shown) are supplied to form an air-fuel mixture. The carburetor 20 is arranged such that the air-fuel mixture produced by the carburetor 20 is somewhat richer than an air-fuel mixture required for the engine operation. Exhaust gases produced by combustion in the combustion chamber 12 are discharged therefrom into the exhaust pipe 16 which includes a catalytic converter 26 for purifying the engine exhaust gases before they are discharged from the exhaust pipe 16 into the atmosphere.

The engine 10 is equipped with an apparatus for controlling the air-fuel ratio of the air-fuel mixture before it is introduced into the combustion chamber 12. The air-fuel ratio controlling apparatus is generally designated by reference numeral 100 and includes an air-fuel ratio detector 102 mounted on the exhaust pipe 16 to detect the air-fuel ratio of the air-fuel mixture by virtue of the oxygen content of the exhaust gases flowing through the exhaust pipe 16. The air-fuel detector 102 is of a conventional type that contains an oxide of a metal, such as zirconium dioxide or titanium dioxide and is operative to emit an electric signal representative of the detected air-fuel ratio. The signal is transmitted by a conductor 104 to a control circuit 106. The control circuit 106 is of a conventional structure, such as one disclosed in U.S. Pat. No. 4,036,186 which was issued on July 19, 1977, and includes a voltage comparing circuit, a pulse generating circuit, logical command circuit, a reversible shift resistor and so on all of which are not shown in the drawings. The control circuit 106 is electrically connected by a conductor 108 to a pulse motor 110 and is responsive to a signal from the air-fuel ratio detector 102 to decide and control the direction of rotation of the pulse motor 110 and the degree of angle of rotation thereof.

The apparatus 100 also includes a passage 112 which bypasses the venturi 20' of the carburetor 20 and the throttle valve 22 so that a part of the air from the air cleaner 18 can flow from the intake duct 14 upstream of the venturi 20' through the bypass passage 112 again into the intake duct 14 downstream of the throttle valve 22 so as to dilute the air-fuel mixture produced by the carburetor 20 to an air-fuel ratio suited for the engine operation. This part of the air will be called "additional air" or "compensating air". An air valve 114 is provided in the bypass passage 112 to control or vary the cross-sectional area of the passage 112 through which the additional air can flow. In the illustrated embodiment, the air valve 114 is in the form of a butterfly valve which is pivotally mounted in the bypass passage 112 and drivingly connected to the pulse motor 110 so as to be driven or rotated by the motor. A pressure controller 116 is provided in the bypass passage 112 downstream of the air valve 114 to control the pneumatic pressure within the passage 112 at a point A between the air valve 114 and the pressure controller 116.

Figure 2:
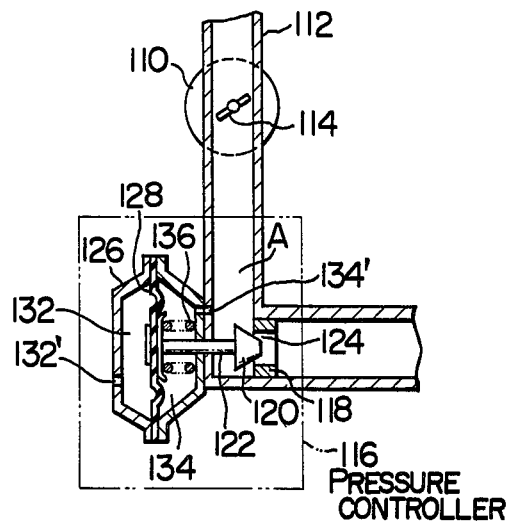
FIG. 2 is an enlarged, fragmentary sectional view of the air-fuel ratio controlling apparatus shown in FIG. 1.

Referring to FIG. 2, the pressure controller 116 comprises a valve seat 118 provided in the bypass passage 112 downstream of the air valve 114. A needle valve 120 having a valve stem 122 is movably mounted in the bypass passage 112 so as to cooperate with the valve seat 118 to define a variable orifice 124. The valve stem 122 slidably extends through the peripheral wall of the bypass passage 112 into a substantially closed hollow casing 126 mounted on a duct or pipe which defines the passage 112 therein. A diaphragm 128 extends across the interior of the casing 126 to cooperate therewith to define a pair of pressure chambers 132 and 134. The chamber 132 is vented to the atmosphere by a vent hole 132' formed in the casing 126. The other chamber 134 is communicated with the bypass passage 112 adjacent to the point A by an aperture 134' which extends through adjoining walls of the passage 112 and of the casing 126. The valve stem 122 has its outer end extending into and through the chamber 134 and secured to the diaphragm 128. A compression coil spring 136 is disposed in the chamber 134 and extends around the valve stem 122 between the disphragm 128 and the wall of the casing 126 adjacent to the bypass passage 112.

When the engine 10 is started or has just been started, the air valve 114 fully closes the bypass passage 112 due to the functions or operations of the air-fuel ratio detector 102 and the control circuit 106. When the engine has been warmed, the control circuit 106 judges on the basis of a signal from the air-fuel ratio detector 102 as to whether or not the air-fuel mixture produced by the carburetor 20 is richer than a predetermined air-fuel ratio (which is required for the optimum engine operation and also for the optimum operation of the catalytic converter 26). The control circuit 106 thus emits a command signal to the pulse motor 110 so that the air valve 114 is rotated to a most suitable position.

When the air valve 114 is in its fully closed position, the engine manifold vacuum is transmitted through the variable orifice 124 in the bypass passage 112 and through the aperture 134' into the pressure chamber 134 in the casing 126 to deform the diaphragm 128 rightwards, as viewed in FIG. 2, against the compression spring 136 with a result that the needle valve 120 is moved to its fully closed position (i.e., the valve 120 is moved into sealing engagement with the valve seat 118).

When the air valve 114 begins to be moved toward an open position by the operation of the air-fuel ratio detector 102 and the control circuit 106, an additional air from the intake duct 14 upstream of the carburetor venturi 20' flows to the point A in the bypass passage 112 and through the aperture 134' into the chamber 134 in the casing 126 to decrease the vacuum in the chamber 134, so that the needle valve 120 is moved leftwards, as viewed in FIG. 2, with a resultant increase in the area of the orifice 124. As such, a rotation of the butterfly valve 114 toward its fully open position results in an increase in the area of the variable orifice 124, whereas a rotation of the butterfly valve 114 toward its fully closed position results in a decrease in the area of the variable orifice 124. In addition, an increase in the engine manifold vacuum results in a decrease in the orifice area, whereas a decrease in the manifold vacuum results in an increase in the orifice area. Accordingly, the pneumatic pressure within the bypass passage 112 at the point A therein is always kept substantially constant. This will mean that the pressure difference across the air valve 114 is kept substantially constant because the pressure within the bypass passage 112 upstream of the air valve 114 is considered to be atmospheric pressure.

The amount of additional air fed through the bypass passage 112 into the intake manifold 24 and thus into the engine 10 is given by the following equation:

$$Q = k S \sqrt{\Delta P}$$

wherein Q is the amount of additional air; S is the air-flow cross-sectional area of the bypass passage 112 at the point of the air valve 114; ΔP is the pressure difference across the air valve 114; and k is a constant.

The equation indicates that the amount of the additional air is entirely free from any influence from the engine manifold vacuum which is variable with variation in the load on the engine 10. Accordingly, the additional air is accurately and precisely metered by the air valve 114 with a resultant advantage that the air-fuel ratio of the air-fuel mixture fed into the combustion chamber 12 of the engine 10 is properly controlled by the apparatus 100 throughout all the operating conditions of the engine.

Figure 3:
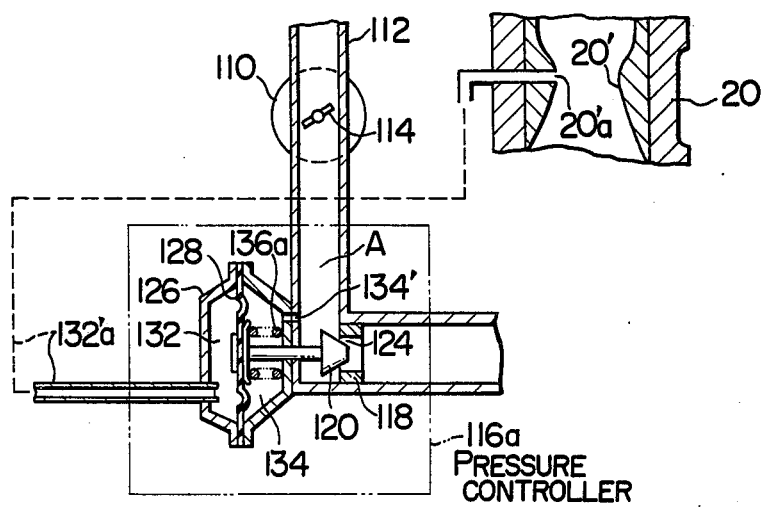
FIG. 3 is a view similar to FIG. 2 but illustrating a modification of the embodiment shown in FIGS. 1 and 2.

FIG. 3 illustrates a modification of the embodiment shown in FIGS. 1 and 2 and, more particularly, of the pressure controller 116 shown in FIG. 2. The modified pressure controller is designated by reference numeral 116a. The modification comprises a conduit 132'a which communicates the pressure chamer 132 in the casing 126 with a vacuum port 20'a formed in the carburetor 20 and being open into the venturi 20' so that the venturi vacuum is introduced through the conduit 132'a into the chamber 132 to cause the diaphragm 128 to be deformed also by the venturi vacuum. The compression spring 136 used in the first embodiment is replaced by another compression spring 136a having a slightly modified resiliency compared with the spring 136. The pressure controller 116a are substantially similar in other points to the pressure controller 116 of the first embodiment. Parts of the controller 116a similar to those of the controller 116 are designated by similar reference numerals.

The modified pressure controller 116a operates as follows: The pressure chamber 134 is operative to decrease the area of the variable orifice 124 with an increase in the engine manifold vacuum and increase the orifice area with a decrease in the engine manifold vacuum, as in the first embodiment described above. Thus, if the vacuum in the other pressure chamber 132 were kept constant, the pressure in the bypass passage 112 at the point A could be kept constant. However, the vacuum in the chamber 132 is substantially equal to the venturi vacuum, which is varied with variation in the engine operating conditions, and thus decreased when the intake air through the venturi 20' is decreased and the venturi vacuum is thus decreased, with a result that the area of the variable orifice 124 is correspondingly decreased. The pressure at the point A of the bypass passage 112 is kept at a low vacuum pressure (by vacuum gauge) accordingly. On the other hand, when the intake air through the venturi 20' is increased with a resultant increase in the venturi vacuum, the vacuum in the pressure chamber 132 is also increased to correspondingly increase the area of the variable orifice 124 with a result that the pressure at the point A in the passage 112 is kept at a high vacuum pressure (by vacuum gauge).

As such, the pressure at the point A in the bypass passage 112 is a vacuum pressure and is substantially proportional to the engine intake air so far as the opening of the air valve 114 is constant. Accordingly, the supply of an additional air to the engine 10 is free from the influence from the engine manifold vacuum and is substantially in proportion to the engine intake air through the venturi 20'. The air-fuel ratio controlling apparatus 100 with the modified pressure controller 116a, therefore, is operative such that the variation in the air-fuel ratio of the air-fuel mixture fed into the engine 10 is minimized throughout all the operating conditions of the engine with a resultant minimization of occurence of hunting which would otherwise take place particularly during a light-load engine operation.

Figure 4:
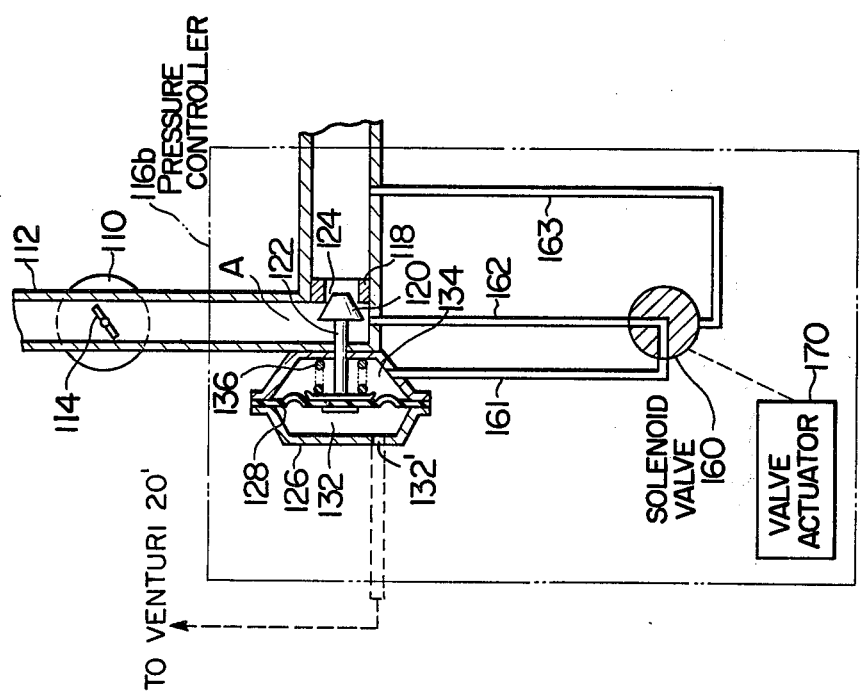
FIG. 4 is a view similar to FIGS. 2 and 3 but illustrates another modification of the embodiment shown in FIGS. 1 and 2.

FIG. 4 illustrates another modification of the pressure controller 116 shown in FIGS. 1 and 2. The modified pressure controller is designated by reference numeral 116a. Parts of the modified pressure controller similar to those of the pressure controller 116 are designated by similar reference numerals. The pressure chamber 132 is vented to the atmosphere by a vent hole 132' as in the pressure controller 116 shown in FIG. 2. The other pressure chamber 134 is connected by a conduit 161 to a multi-position solenoid valve 160 which is turn is connected by conduits 162 and 163 to the bypass passage 112 at a first point between the air valve 114 and the variable orifice 124 and at a second point downstream of the orifice 124. The solenoid valve 160 is actuated by a valve actuator 170 such that either the pressure in the bypass passage 112 at the first point upstream of the variable orifice 124 or the pressure in the passage 112 at the second point downstream of the orifice 124 is fed through the conduit 162 or the conduit 163 and through the conduit 161 into the pressure chamber 134. The valve actuator 170 may be of such a type that is responsive to variations in the temperature of the engine cooling water to control the solenoid valve 160 such that, during warm-up operation of the engine 10, the valve 160 communicates the conduit 161 with the conduit 163 to feed the pressure in the bypass passage 112 downstream of the orifice 124, i.e., the engine manifold vacuum, into the pressure chamber 134 and such that, during other operating conditions of the engine 10, the valve 160 communicates the conduit 161 with the conduit 162 to feed the pressure in the bypass passage 112 at the point A (upstream of the orifice 124) into the pressure chamber 134. By controlling the introduction of pneumatic pressure in the manner described, it is assured that the variable orifice 124 is fully closed during warm-up operation of the engine 10 regardless of the opening of the air valve 114 to thereby interrupt the supply of the additional air into the engine 10 with a resultant advantage that the engine is supplied only with a rich air-fuel mixture produced by the carburetor 20. This greatly improves the behavior and drivability of the engine 10 during warm-up operation thereof.

The valve actuator 170 may alternatively be arranged to control the solenoid valve 160 such that the variable orifice 124 is fully closed at any time when the engine operation is started regardless of whether the engine 10 has been warmed up or not. Further alternatively, the valve actuator 170 may be arranged such that the variable orifice 124 is fully closed when the engine throttle valve 22 is fully opened to thereby assure that the air-fuel ratio of the air-fuel mixture fed into the engine 10 meets with the requirement by this engine operating condition.

The pressure controller 116b may be further modified such that the pressure chamber 132 is pneumatically connected by a conduit (shown in dash lines) to the venturi 20' of the carburetor 20, as in the modification shown in FIG. 3, so that the venturi vacuum is transmitted into the pressure chamber 132.

Figure 5:
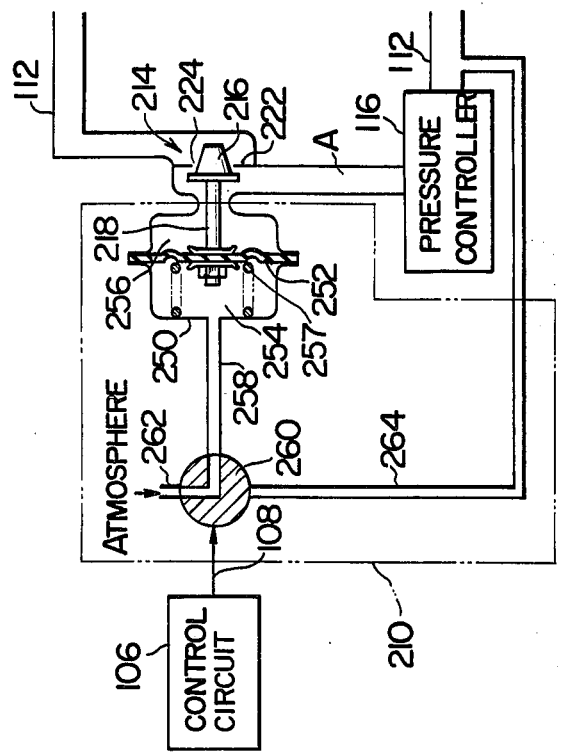
FIG. 5 is a fragmentary diagrammatic illustration of a second embodiment of the invention.

FIG. 5 illustrates a second embodiment of the invention, in which the butterfly valve 114 and the pulse motor 110 of the first embodiment are replaced by a needle valve 214 and a valve actuator 210 therefor. Parts of the second embodiment similar to those of the first embodiment are designated by similar reference numerals.

The needle valve 214 has a frusto-conical valve head 216 secured to a valve stem 218 and is operatively associated with an annular valve seat 222 provided in the bypass passage 112 to cooperate with the valve seat to define a variable orifice 224 in the passage 112. The valve actuator 210 is of a diaphragm type and comprises a hollow casing 250. A diaphragm 252 extends across the interior of the casing 250 to cooperate therewith to define two chambers 254 and 256. The valve stem 218 extends into the chamber 256 and is secured to the diaphragm 252. A compression spring 257 is provided in the other chamber 254 and extends between the casing 250 and the diaphragm 252 to bias the same toward the valve seat 222. The chamber 254 is pneumatically connected by a conduit 258 to a multi-position solenoid valve 260 which is electrically connected by the conductor 108 to the control circuit 106. The solenoid valve 260 has an atmospheric pressure inlet port 262 and is pneumatically connected to the bypass passage 112 downstream of the pressure controller 116. The valve 260 is operative to switch the communication between the conduit 258, the atmospheric pressure inlet port 262 and the conduit 264 so that the pressure chamber 254 in the casing 250 is supplied with either the atmospheric pressure or the engine manifold vacuum whereby the area of the variable orifice 224 may be controlled.

In the embodiment shown in FIG. 5, the solenoid valve 260 is pneumatically connected by the conduit 264 to the bypass passage 112 downstream of the pressure controller 116 so that the engine manifold vacuum can be supplied through the valve 260 into the pressure chamber 254. This, however, is not essential for the operation of the valve actuator 210. The pressure chamber 254 may be supplied with any other pressure signal which is proportional to the engine intake air, such as the venturi vacuum, for example. Moreover, the pressure controller 116 used in the embodiment in FIG. 5 may be replaced by the modified pressure controller 116a or 116b.

What is claimed is:

1. In an internal combustion engine including a combustion chamber, an intake duct for supplying an air-fuel mixture into said combustion chamber, an exhaust pipe for conveying combustion gases from said combustion chamber to the atmosphere, a carburetor in said intake duct for producing the air-fuel mixture, and a throttle valve pivotally mounted in said intake duct downstream of said carburetor for controlling the flow of the air-fuel mixture through said intake duct into said combustion chamber; the improvement which comprises:

an apparatus for controlling the air-fuel ratio of the air-fuel mixture supplied into said combustion chamber, said air-fuel ratio controlling apparatus including;

an air-fuel ratio detecting means disposed in said exhaust pipe to detect the oxygen content of the combustion gases flowing therethrough for thereby detecting the air-fuel ratio of the air-fuel mixture supplied into said combustion chamber;

a passage bypassing said carburetor and said throttle valve and having a downstream end connected to said intake duct downstream of said throttle valve for supplying an additional air into said intake duct;

air valve means in said bypass passage for controlling the cross-sectional area of said bypass passage through which said additional air is permitted to flow to said intake duct downstream of said throttle valve;

means drivingly connected to said air valve means and operatively associated with said air-fuel ratio detecting means for actuating said air valve means such that the airflow cross-sectional area of said bypass passage is increased when the detected air-fuel ratio is smaller than a predetermined value; and pressure control means for controlling the pressure in said bypass passage downstream of said air valve means, said pressure control means including:

a valve seat disposed in said bypass passage downstream of said air valve means;

means including a deformable diaphragm and defining first and second pressure chambers with said diaphragm;

a multi-position valve having a first port pneumatically connected to said first pressure chamber, a second port pneumatically connected to said bypass passage at a first point between said air valve means and said valve seat and a third port pneumatically connected to said bypass passage at a second point downstream of said valve seat and upstream of said combustion chamber, said second pressure chamber being communicated with a venturi in said carburetor so that said second pressure chamber is supplied with venturi vacuum;

means operatively associated said multi-position valve and responsive to variations in one of the operating conditions of the engine to actuate said valve for thereby selectively switching over the communication of said second and third ports with said first port so that said first pressure chamber is supplied with a pressure at one of said first and second points in said bypass passage; and a needle valve cooperative with said valve seat to define a variable orifice and drivingly connected to said diaphragm.

2. An air-fuel ratio controlling apparatus according to claim 1, wherein said valve actuating means is responsive to variations in the temperature of the engine and operative such that said first and third ports of said valve are communicated with each other when said engine temperature is below a predetermined value and said first and second ports of said valve are communicated with each other when the engine temperature exceeds said predetermined value.

3. An air-fuel ratio controlling apparatus according to claim 1, wherein said air valve means comprise a valve member rotatably mounted in said bypass passage to vary the air-flow cross-sectional area of said bypass passage, and wherein said means for actuating said air valve means comprise a control circuit electrically connected to said air-fuel ratio detecting means and a pulse motor electrically connected to said control circuit and electronically actuated thereby, said pulse motor being mechanically connected to said valve member so that the latter is rotated by said pulse motor.

* * * * *